(12) United States Patent
Shimasaki et al.

(10) Patent No.: US 6,176,081 B1
(45) Date of Patent: Jan. 23, 2001

(54) HEATING DEVICE FOR AN EXHAUST GAS PURIFICATION CATALYTIC CONVERTER

(75) Inventors: Yuichi Shimasaki; Hironao Fukuchi; Hiroaki Kato; Kazutomo Sawamura, all of Saitama; Yasushi Kato, Nagoya, all of (JP)

(73) Assignees: Honda Giken Kogyo Kabushiki Kaisha, Tokyo; NGK Insulators, Inc., Nagoya, both of (JP)

( * ) Notice: Under 35 U.S.C. 154(b), the term of this patent shall be extended for 0 days.

(21) Appl. No.: 09/265,426

(22) Filed: Mar. 10, 1999

(30) Foreign Application Priority Data

Mar. 12, 1998 (JP) .................................................. 10-061400

(51) Int. Cl.7 ........................................................ F01N 3/10
(52) U.S. Cl. .......................... 60/300; 392/485; 219/541; 422/174
(58) Field of Search ............................... 60/300; 422/174; 392/485; 219/541; 55/30

(56) References Cited

U.S. PATENT DOCUMENTS

| 5,318,756 | 6/1994 | Sheller et al. | 422/174 |
| 6,031,213 | 2/2000 | Hashimoto et al. | 219/541 |

FOREIGN PATENT DOCUMENTS

| 8-218857 | 8/1996 | (JP) . |
| 8-316660 | 11/1996 | (JP) . |

*Primary Examiner*—Teresa Walberg
*Assistant Examiner*—Shawntina Fuqua
(74) *Attorney, Agent, or Firm*—Armstrong, Westerman, Hattori, McLeland & Naughton

(57) ABSTRACT

In a heating device for an exhaust gas purification catalytic converter, an insulating coating or an insulating material is provided between a tubular electrode receiving member of a power relay means and an electrode received in this electrode receiving member.

8 Claims, 4 Drawing Sheets

HEATING DEVICE FOR AN EXHAUST GAS PURIFICATION CATALYTIC CONVERTER

BACKGROUND OF THE INVENTION

1. Field of the Invention

This invention relates to a catalytic converter for purifying exhaust gas from an internal combustion engine, and more particularly to a device for heating such a catalytic converter.

The present application is based on Japanese Patent Application No. Hei. 10-61400, which is incorporated herein by reference.

2. Description of the Related Art

A catalytic converter, used for purifying exhaust gas from an internal combustion engine mounted on an automobile or the like, performs an efficient exhaust gas purification effect when it is placed in a high-temperature, activated condition of not less than about 350° C. Namely, in a cold condition of the engine as when starting the engine in a low-temperature condition, the exhaust gas purification properties of the catalytic converter are extremely aggravated. Therefore, the temperature of the catalytic converter need to be rapidly raised to a predetermined temperature so that the converter can be brought into a high-temperature, activated condition. Therefore, there is known, for example, a catalytic converter-heating device of the electrically-heated type in which an electric heater of the electrically-heated type is provided upstream of a catalyst unit so as to heat exhaust gas. This electric heater comprises, for example, a flat, disk-shaped honeycomb body made of metal. The electric heater is retained by an annular housing made of metal, and further there is provided a power relay means for relaying electric power to the metal honeycomb body. Preferably, a catalytic material is coated on the surface of the metal honeycomb body. Further, slits are formed in the metal honeycomb body in a zigzag manner in parallel relation to each other. When an electric current is flowed from one end at the circumferential portion of the metal honeycomb body to the other end disposed in diametrically-opposite relation thereto, a path of the current is zigzag so that the metal honeycomb body can be heated uniformly. The electric heater itself burns the unburned components in the exhaust gas under the influence of the catalytic material provided on the surface of the metal honeycomb body. And the electric heater is further heated by oxidation heat due to this burning, thereby effecting the rapid heating of the exhaust gas. Therefore, this heating device is called an electrically-heated catalyst (EHC).

FIG. 1 shows one example of a catalytic converter of the electrically-heated type. As shown in this Figure, an auxiliary catalyst unit 103 is provided upstream of main catalyst units 102 mounted in an exhaust pipe 101, and an EHC 104 is provided upstream of the auxiliary catalyst unit 103. In the catalytic converter of this construction, when an internal combustion engine is in a cold condition as at the time immediately after starting the engine, a switch SW is operated to apply, for example, a battery voltage $V_B$ to the EHC to heat the same. As a result, an electric heater (not shown) of the EHC 104 is heated to promote the oxidation of unburned components of hydrocarbons in the exhaust gas, and therefore the electric heater is rapidly heated partly with the aid of this oxidation heat, and heats the exhaust gas. As a result, the auxiliary catalyst unit 103 of the next stage is heated, and further the main catalyst units 102 are heated, so that the whole of the catalytic converter is rapidly activated.

For example, Japanese Patent Publication No. Hei. 8-218857 discloses a construction of an electric heater of the electrically-heated type for such a catalytic converter and an electrode for supplying electric power to this heater. An end portion of a lead wire for supplying electric power to the electric heater from the exterior is detachably incorporated in the electric heater, and this construction has features that handiness such as the assembling efficiency is excellent and that electrically-insulating properties and exhaust gas-sealing properties are excellent.

FIG. 2 shows a construction of an electric power supply portion of an EHC. As described above, the EHC comprises a flat, disk-shaped honeycomb structural body 2 retained in a metal housing 1 by a retaining structure (not shown). This honeycomb structural body 2 serves as an electric heater. On the other hand, an electrode receiving member 3 of a tubular shape extends through a through hole formed in the metal housing 1. An electrode rod 4 is retained in the electrode receiving member 3 by an insulating retaining member 5 in spaced relation to the inner surface of the electrode receiving member 3. The electrode rod 4 projects from the electrode receiving member 3 toward the honeycomb structural body 2. A distal end of the projected portion of the electrode rod 4 is electrically connected to a flexible connecting member 6 made of metal while the other end of the electrode rod 4 is electrically connected to a sheathed lead wire 8 having an insulating sheath 7. A waterproof member 10 is interposed between the sheathed lead wire 8 and an electrode-retaining tubular member 9, and is compressively clamped from the outside. The retaining member 5 comprises a first insulating member 5a and a second insulating member 5b both of which are made of a ceramics material of an inorganic material, and insulating powder 5c of an inorganic material filled in a space formed between the first and second insulating members 5a and 5b. With this construction of the retaining member 5, the vibration of the electrode rod 4 due, for example, to impingement of solid materials flying from the outside of the exhaust pipe, as well as a heat cycle developing in the electrode rod 4, can be absorbed by the powder 5c, and therefore an airtight seal between the outside and inside of the exhaust pipe 101 can be maintained.

The power relay means for feeding electric power to the honeycomb structural member 2 is formed by the above construction.

Generally, exhaust gas from an internal combustion engine contains pyrolytic high molecular substances and free carbons due to engine oil, and abrasion powder resulting from a cylinder wall and a piston ring. These foreign matters adhere to the projected portion of the electrode and the honeycomb structural member which are exposed directly to a stream of exhaust gas. Particularly when the electrically-conductive foreign matters adhere to and deposit on the projected portion of the electrode and its vicinity, this deteriorates the ability of insulation between the housing portion (the grounded side) and the electrode rod having a potential difference relative thereto.

SUMMARY OF THE INVENTION

It is therefore an object of this invention to provide a heating device for an exhaust gas purification catalytic converter, in which the insulating ability in an power relay means of an EHC is prevented from being deteriorated.

According to the present invention, there is provided a heating device for an exhaust gas purification catalytic converter comprising an annular metal housing, an electric heater mounted within the metal housing, power relay means fixedly mounted on the metal housing so as to relay electric power to the electric heater. The power relay means comprises a tubular electrode receiving member extending into the inside of the metal housing from the outside thereof through a peripheral wall thereof, an electrode rod which is received in the electrode receiving member, and projects from the receiving member toward the heater, an insulating retaining member retaining the electrode rod in spaced relation to an inner surface of the electrode receiving member, and an electrically-conductive connecting member electrically connecting a projected end of the electrode rod to one end of the heater. Further, an insulating coating is provided on at least one of the inner surface of the electrode receiving member and a portion of the electrode rod facing the inner surface. Therefore, even if foreign matters, contained in exhaust gas, deposit in the vicinity of the electrode rod of the power relay means, the insulating ability is prevented from being deteriorated.

In the heating device for an exhaust gas purification catalytic converter of the present invention, at least an insulating material is filled in a space formed between the inner surface of the electrode receiving member and a portion of the electrode rod facing the inner surface, and an insulating material is filled in a space formed between the connecting member and that portion of the electrode receiving member or the metal housing facing the connecting member. With this construction, foreign matters, contained in the exhaust gas, are prevented from depositing in these spaces, and therefore the insulating ability is prevented from being deteriorated.

In the heating device for an exhaust gas purification catalytic converter of the present invention, an insulating coating is provided at least on a portion of the surface of the connecting member which is disposed adjacent to the end of the electrode rod projecting toward the electric heater, and faces the electrode receiving member or the metal housing. With this construction, the deterioration of the insulating ability is sufficiently prevented.

Features and advantages of the invention will be evident from the following detailed description of the preferred embodiments described in conjunction with attached drawings.

DETAILED DESCRIPTION OF THE PREFERRED EMBODIMENTS

A preferred embodiment of the present invention will now be described.

Figure 1:
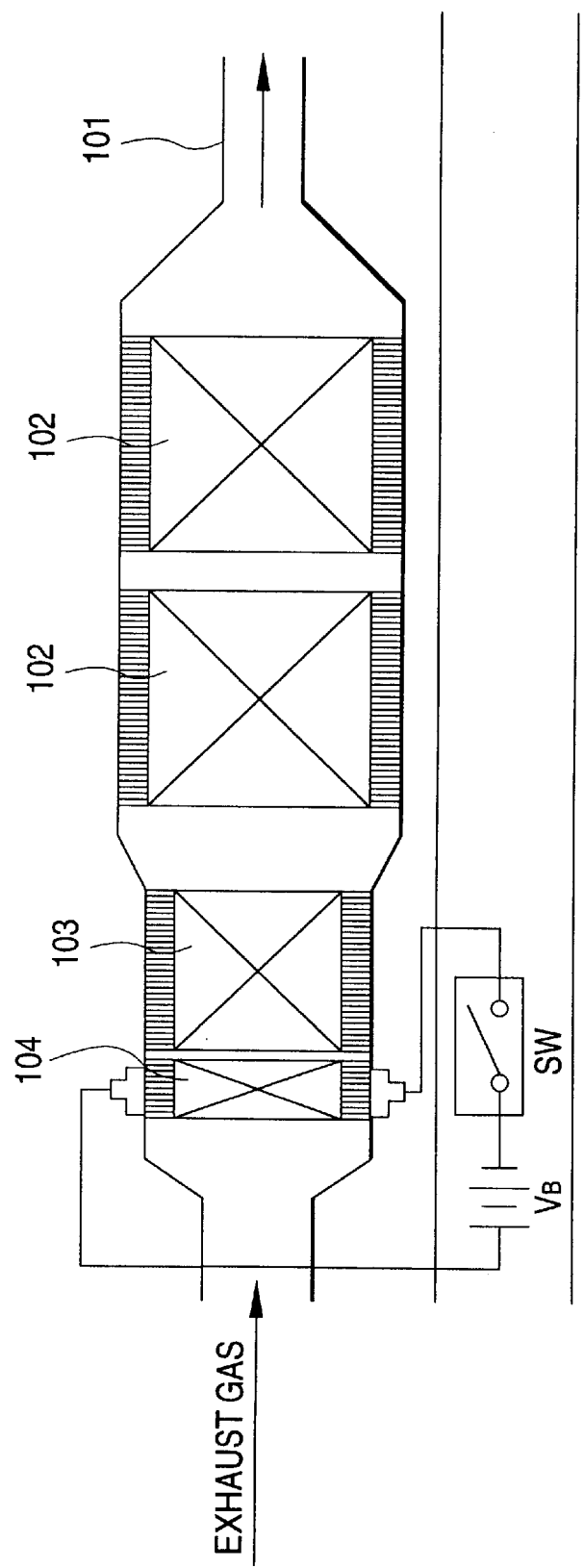
FIG. 1 is a cross-sectional view of a catalytic converter provided in an exhaust system of an internal combustion engine.
Figure 2:
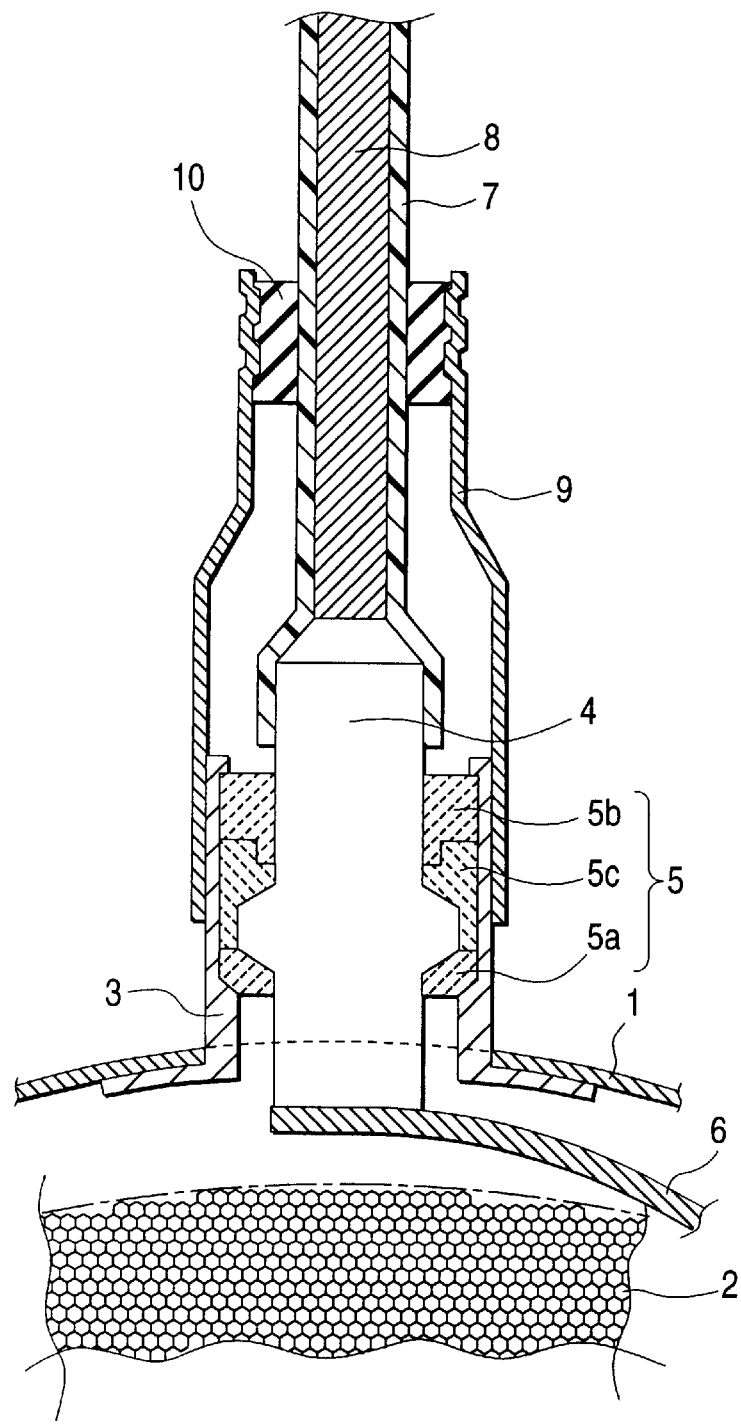
FIG. 2 is a cross-sectional view showing one example of an EHC contained in the catalytic converter of FIG. 1.
Figure 3:
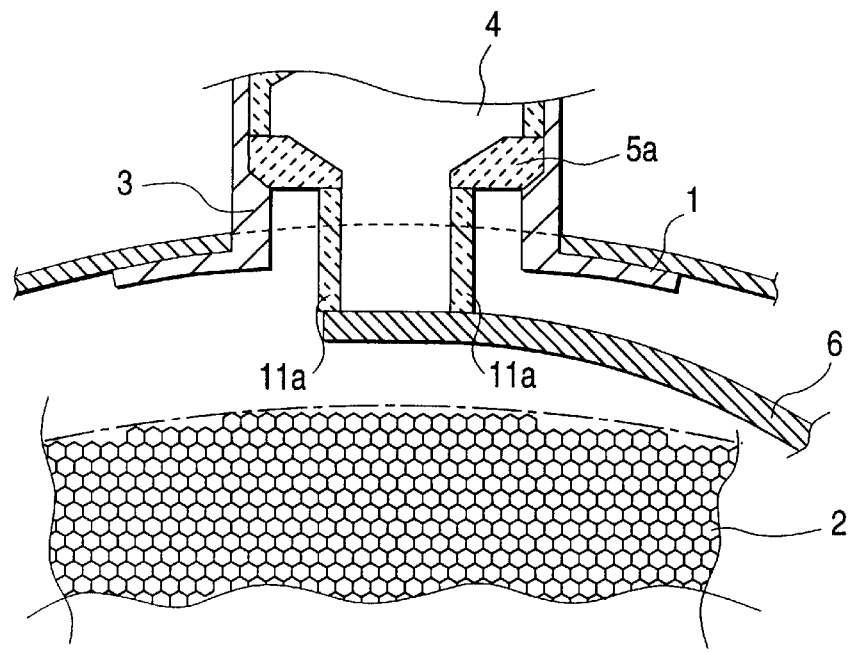
FIG. 3 is an enlarged, cross-sectional view of a portion of an embodiment of the invention.

A heating device of the present invention is similar in construction to the device shown in FIG. 2, and FIG. 3 show a projected end portion of an electrode rod 4, projecting into the interior of a metal housing 1, and its neighboring portions on an enlarged scale. In the heating device shown in FIG. 3, at least a portion of the surface of the electrode rod 4, facing (or opposed to) an electrode receiving member 3, is covered with an insulating coating 11a. It is preferred that a portion of the electrode rod 4 to be exposed to exhaust gas should be covered with this insulating coating 11a. Preferably, the insulating coating 11a is made of a ceramics material of an inorganic material, such for example as alumina ($Al_2O_3$). The insulating coating 11a may be formed into a cylindrical body having an inner diameter slightly larger than the cross-section of the electrode rod 4. This formed body is fitted on the electrode rod 4, and is retained thereon by disengagement prevention means (not shown). In this construction, the insulating coating 11a is spaced from a portion of the electrode receiving member 3 facing this insulating coating 11a, and vibrations are absorbed at this portion, and therefore the durability is excellent. And besides, the insulating coating 11a can be applied after the electrode rod 4 and the electrode receiving member 3 are mounted on the metal housing 1, and therefore the insulating coating 11a is prevented from being damaged during the assembling operation. Namely, the insulating coating is provided on at least one of the inner surface of the electrode receiving member 3 and a portion of the electrode rod 4 facing this inner surface. With this construction, even if electrically-conductive foreign matters, contained in the exhaust gas, adhere or deposit between the electrode rod 4 and the electrode receiving member 3, the ability of insulation between the two is prevented from being deteriorated.

Figure 4:
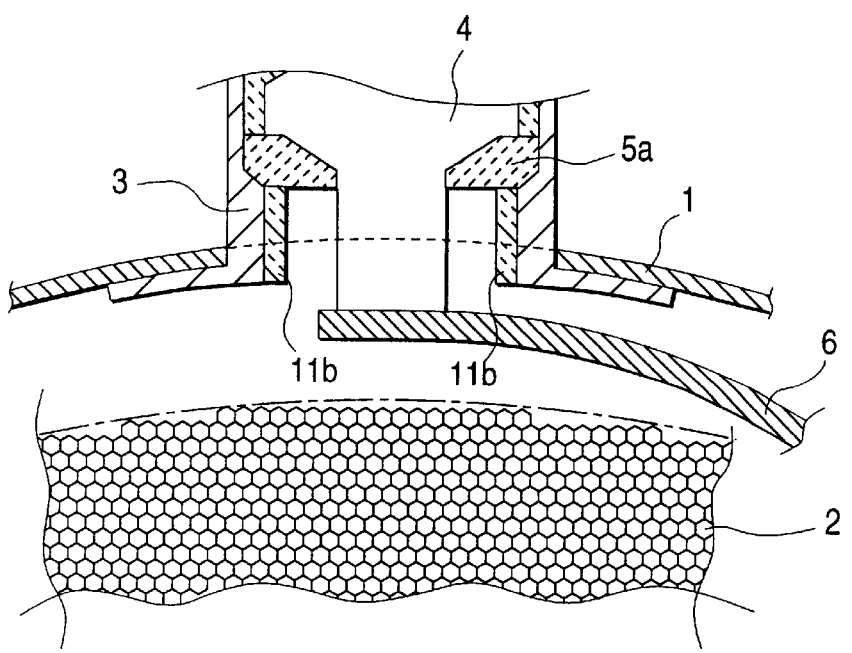
FIG. 4 is an enlarged, cross-sectional view of a portion of another embodiment of the invention.

FIG. 4 shows another embodiment of a heating device of the present invention. In this embodiment, an insulating coating 11b is provided on a portion of an inner surface of an electrode receiving member 3 facing an electrode rod 4. The insulating coating 11b is made of the same material as described above for FIG. 3. Namely, the insulating coating is provided on at least one of the inner surface of the electrode receiving member 3 and a portion of the electrode rod 4 facing this inner surface. In this construction, the insulating coating 11b is spaced from the portion of the electrode rod 4 facing this insulating coating 11b, and vibrations are absorbed at this portion, and therefore the durability is excellent. With this construction, even if electrically-conductive foreign matters, contained in the exhaust gas, adhere or deposit between the electrode rod 4 and the electrode receiving member 3, the ability of insulation between the two is prevented from being deteriorated.

Figure 5:
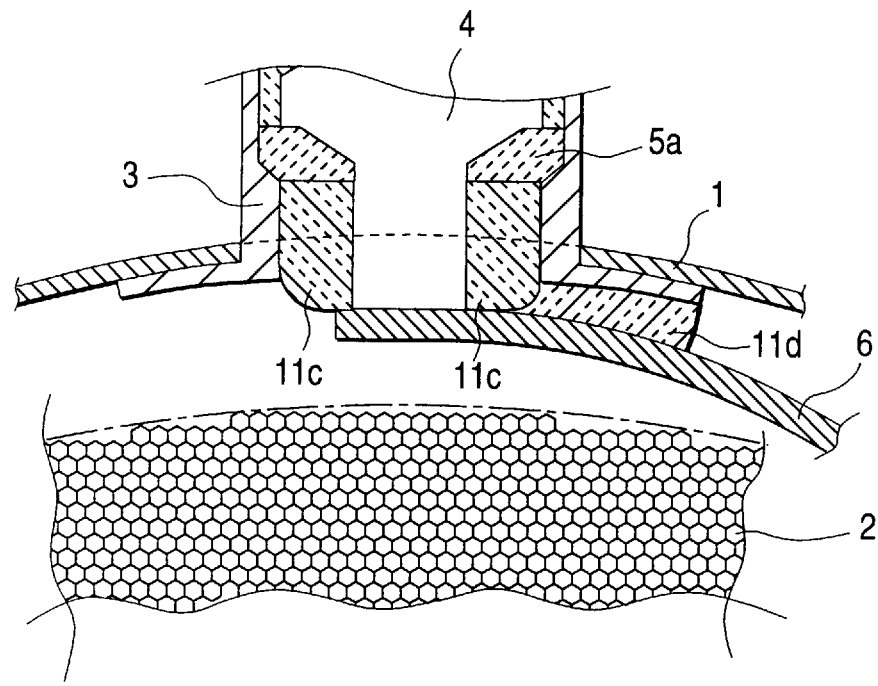
FIG. 5 is an enlarged, cross-sectional view of a portion of a further embodiment of the invention.

In an embodiment shown in FIG. 5, an insulating material 11c is filled in a gap (space) between an electrode receiving member 3 and an electrode rod 4. And an insulating material 11d is filled in a space formed between a connecting member 6 and a portion of the electrode receiving member 3 or a metal housing 1 facing the connecting member 6. Thus, the gap between the inner surface of the electrode receiving member 3 and the electrode rod 4 is filled with the insulating material 11c. And the space, formed between the connecting member 6 and the portion of the electrode receiving member 3 or the metal housing 1 facing the connecting member 6, is filled with the insulating material 11d. With this construction, the deposition of foreign matters in these gaps or spaces is prevented. Namely, the insulating material is filled in the space formed between the inner surface of the electrode receiving member 3 and a portion of the electrode rod 4 facing this inner surface. And also the insulating material is filled in the space formed between the connecting member 6 and the portion of the electrode receiving member 3 or the metal housing 1 facing the connecting member 6.

With this construction, electrically-conductive foreign matters, contained in exhaust gas, are prevented from adhering to or depositing in the space between the electrode rod 4 and the electrode receiving member 3 and the space between the connecting member 6 and the electrode receiving member 3 or the metal housing 1. Therefore the more enhanced insulating effect can be obtained. And besides, by forming an insulating member 5a and the insulation materials 11c and 11d integrally with each other, the number of the component parts can be reduced.

Figure 6:
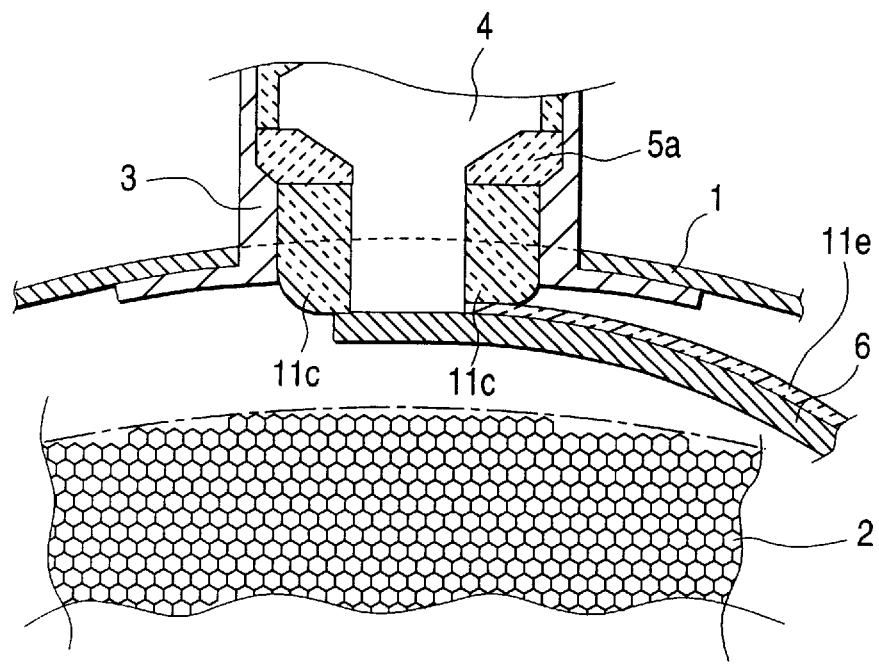
FIG. 6 is an enlarged, cross-sectional view of a portion of a still further embodiment of the invention.

In an embodiment shown in FIG. 6, an insulating coating 11e is formed on the surface of a connecting member 6. In order to absorb a thermal expansion of an electric heater 2, the connecting member 6 has flexibility. Therefore, the insulating coating 11e also need to have a certain degree of flexibility. Namely, the insulating coating is provided at least on a portion of the surface of the connecting member 6 which is disposed adjacent to an end of an electrode rod 4 projecting toward the electric heater 2, and faces an electrode receiving member 3 or a metal housing 1. With this construction, even if electrically-conductive foreign matters, contained in the exhaust gas, adhere or deposit, the insulating ability is prevented from being deteriorated.

By suitably using the insulating coatings 11a, 11b and 11e and the insulating materials 11c and 11d in combination, the double insulating construction can be obtained, and the deterioration of the insulating ability is more positively prevented.

As described above, the heating device for an exhaust gas purification catalytic converter of the present invention comprises the annular metal housing, the electric heater mounted within the metal housing, the power relay means fixedly mounted on the metal housing so as to relay electric power to the electric heater, and the power relay means comprises the tubular electrode receiving member extending into the inside of the metal housing from the outside thereof through the peripheral wall thereof, the electrode rod which is received in the electrode receiving member, and projects from the receiving member toward the heater, the insulating retaining member retaining the electrode rod in spaced relation to the inner surface of the electrode receiving member, and the electrically-conductive connecting member electrically connecting the projected end of the electrode rod to one end of the heater, and that the insulating coating is provided on at least one of the inner surface of the electrode receiving member and that portion of the electrode rod facing the inner surface. With this construction, even if foreign matters, contained in exhaust gas, deposit in the vicinity of the electrode rod of the power relay means, the insulating ability is prevented from being deteriorated.

In the heating device for an exhaust gas purification catalytic converter of the present invention, the insulating material is filled in the space formed between the inner surface of the electrode receiving member and that portion of the electrode rod facing the inner surface, and the insulating material is filled in the space formed between the connecting member and that portion of the electrode receiving member or the metal housing facing the connecting member. With this construction, foreign matters, contained in the exhaust gas, are prevented from depositing in these spaces, and therefore the deterioration of the insulating ability is sufficiently prevented.

In the heating device exhaust gas purification catalytic converter of the present invention, the insulating coating is provided on that portion of the surface of the connecting member disposed adjacent to the end of the electrode rod, and therefore, the deterioration of the insulating ability is sufficiently prevented.

Although the invention has been described in its preferred formed with a certain degree of particularity, it is understood that the present disclosure of the preferred form can be changed in the details of construction and in the combination and arrangement of parts without departing from the spirit and the scope of the invention as hereinafter claimed.

What is claimed is:

1. A heating device for an exhaust gas purification catalytic converter comprising:

an annular metal housing;

an electric heater mounted within said metal housing; and power relay means fixedly mounted on said metal housing so as to relay electric power to said electric heater, said power relay means comprising:

a tubular electrode receiving member extending into an inside of said metal housing from an outside thereof through a peripheral wall thereof;

an electrode rod being received in said electrode receiving member and projecting from said receiving member toward said electric heater;

an insulating retaining member retaining said electrode rod in spaced relation to an inner surface of said electrode receiving member; and an electrically-conductive connecting member electrically connecting a projected end of said electrode rod to one end of said heater, wherein a first insulating coating is provided on at least one of the inner surface of said electrode receiving member and a portion of said electrode rod facing the inner surface of said electrode receiving member; and wherein a second insulating coating is provided at least on a portion of a surface of said connecting member which is disposed adjacent to the projected end of said electrode rod, and faces one of said electrode receiving member and said metal housing.

2. A heating device for an exhaust gas purification catalytic converter comprising:

an annular metal housing;

an electric heater mounted within said metal housing; and power relay means fixedly mounted on said metal housing so as to relay electric power to said electric heater, said power relay means comprising:

a tubular electrode receiving member extending into an inside of said metal housing from an outside thereof through a peripheral wall thereof;

an electrode rod being received in said electrode receiving member and projecting from said receiving member toward said electric heater;

an insulating retaining member retaining said electrode rod in spaced relation to an inner surface of said electrode receiving member; and an electrically-conductive connecting member electrically connecting a projected end of said electrode rod to one end of said heater, wherein a first insulating coating is provided on at least one of the inner surface of said electrode receiving member and a portion of said electrode rod facing the inner surface of said electrode receiving member; and wherein said first insulating coating is provided on the inner surface of said electrode receiving member, and said first insulating coating is spaced from said electrode rod.

3. A heating device for an exhaust gas purification catalytic converter comprising:
an annular metal housing;
an electric heater mounted within said metal housing; and
power relay means fixedly mounted on said metal housing so as to relay electric power to said electric heater, said power relay means comprising:
a tubular electrode receiving member extending into an inside of said metal housing from an outside thereof through a peripheral wall thereof;
an electrode rod being received in said electrode receiving member and projecting from said receiving member toward said electric heater;
an insulating retaining member retaining said electrode rod in spaced relation to an inner surface of said electrode receiving member; and
an electrically-conductive connecting member electrically connecting a projected end of said electrode rod to one end of said heater,
wherein a first insulating material is filled in a first space formed between the inner surface of said electrode receiving member and a portion of said electrode rod facing the inner surface of said electrode receiving member, and a second insulating material is filled in a second space formed between said connecting member and a portion of one of said electrode receiving member facing said connecting member and said metal housing facing said connecting member.

4. A heating device for an exhaust gas purification catalytic converter according to claim 3, wherein said first insulating material and said second insulating material are formed integrally with each other.

5. A heating device for an exhaust gas purification catalytic converter comprising:
an annular metal housing;
an electric heater mounted within said metal housing; and
power relay means fixedly mounted on said metal housing so as to relay electric power to said electric heater, said power relay means comprising:
a tubular electrode receiving member extending into an inside of said metal housing from an outside thereof through a peripheral wall thereof;
an electrode rod being received in said electrode receiving member and projecting from said receiving member toward said electric heater;
an insulating retaining member retaining said electrode rod in spaced relation to an inner surface of said electrode receiving member; and
an electrically-conductive connecting member electrically connecting a projected end of said electrode rod to one end of said heater,
wherein a first insulating material is filled in a first space formed between the inner surface of said electrode receiving member and a portion of said electrode rod facing the inner surface of said electrode receiving member, and an insulating coating is provided at least on a portion of a surface of said connecting member which is disposed adjacent to the projected end of said electrode rod, and faces one of said electrode receiving member and said metal housing.

6. A heating device for an exhaust gas purification catalytic converter comprising:
an annular metal housing;
an electric heater mounted within said metal housing; and
power relay means fixedly mounted on said metal housing so as to relay electric power to said electric heater, said power relay means comprising:
a tubular electrode receiving member extending into an inside of said metal housing from an outside thereof through a peripheral wall thereof;
an electrode rod being received in said electrode receiving member and projecting from said receiving member toward said electric heater;
an insulating retaining member retaining said electrode rod in spaced relation to an inner surface of said electrode receiving member; and
an electrically-conductive connecting member electrically connecting a projected end of said electrode rod to one end of said heater,
wherein an insulating coating is provided on a portion of said electrode rod facing the inner surface of said electrode receiving member, and said insulating coating connects successively said insulating retaining member with said electrically-conductive connecting member.

7. A heating device for an exhaust gas purification catalytic converter comprising:
an annular metal housing;
an electric heater mounted within said metal housing; and
power relay means fixedly mounted on said metal housing so as to relay electric power to said electric heater, said power relay means comprising:
a tubular electrode receiving member extending into an inside of said metal housing from an outside thereof through a peripheral wall thereof;
an electrode rod being received in said electrode receiving member and projecting from said receiving member toward said electric heater;
an insulating retaining member retaining said electrode rod in spaced relation to an inner surface of said electrode receiving member; and
an electrically-conductive connecting member electrically connecting a projected end of said electrode rod to one end of said heater,
wherein an insulating material is filled in a space formed between the inner surface of said electrode receiving member and a portion of said electrode rod facing the inner surface of said electrode receiving member, and said insulating material connects successively said insulating retaining member with said electrically-conductive connecting member.

8. A heating device for an exhaust gas purification catalytic converter comprising:
an annular metal housing;
an electric heater mounted within said metal housing; and
power relay means fixedly mounted on said metal housing so as to relay electric power to said electric heater, said power relay means comprising:
a tubular electrode receiving member extending into an inside of said metal housing from an outside thereof through a peripheral wall thereof;
an electrode rod being received in said electrode receiving member and projecting from said receiving member toward said electric heater;
an insulating retaining member retaining said electrode rod in spaced relation to an inner surface of said electrode receiving member; and
an electrically-conductive connecting member electrically connecting a projected end of said electrode rod to one end of said heater,
wherein an insulating coating is provided on a portion of a surface of said connecting member which is disposed adjacent to the projected end of said electrode rod and faces one of said electrode receiving member and said metal housing, an insulating material is filled in a space formed between the inner surface of said electrode receiving member and a portion of said electrode rod facing the inner surface of said electrode receiving member, and said insulating material connects successively said insulating retaining member with said electrically-conductive connecting member through said insulating coating.

* * * * *